US009310603B2

(12) United States Patent
Fan et al.

(10) Patent No.: US 9,310,603 B2
(45) Date of Patent: Apr. 12, 2016

(54) IMAGE CAPTURE SYSTEM WITH EMBEDDED ACTIVE FILTERING, AND IMAGE CAPTURING METHOD FOR THE SAME

(71) Applicant: HTC Corporation, Taoyuan, Taoyuan County (TW)

(72) Inventors: Fu-Cheng Fan, Taoyuan (TW); Ming-Tien Lin, Taoyuan (TW)

(73) Assignee: HTC CORPORATION, Taoyuan (TW)

( * ) Notice: Subject to any disclaimer, the term of this patent is extended or adjusted under 35 U.S.C. 154(b) by 84 days.

(21) Appl. No.: 14/109,085

(22) Filed: Dec. 17, 2013

(65) Prior Publication Data

US 2015/0172564 A1  Jun. 18, 2015

(51) Int. Cl.
*H04N 5/225* (2006.01)
*G02B 26/00* (2006.01)

(52) U.S. Cl.
CPC ............ *G02B 26/007* (2013.01); *G02B 26/005* (2013.01)

(58) Field of Classification Search
CPC ..................................................... G02B 26/007
USPC ........................................................ 348/342
See application file for complete search history.

(56) References Cited

U.S. PATENT DOCUMENTS

| 5,493,335 | A | 2/1996 | Parulski et al. |
| 7,889,987 | B2 | 2/2011 | Nitanda |
| 2006/0215076 | A1* | 9/2006 | Karim ................. A42B 3/044 349/86 |
| 2010/0182671 | A1* | 7/2010 | Park ..................... G02F 1/0311 359/245 |
| 2011/0261233 | A1 | 10/2011 | Zhang et al. |
| 2012/0051730 | A1 | 3/2012 | Cote et al. |

FOREIGN PATENT DOCUMENTS

| CN | 101975988 A | 2/2011 |
| JP | 2000-356792 A | 12/2000 |
| TW | 200819792 A | 5/2008 |

OTHER PUBLICATIONS

Kim, W. et al. "A 1.5Mpixel RGBZ CMOS Image Sensor for Simultaneous Color and Range Image Capture," Solid-State Circuits Conference Digest of Technical Papers (ISSCC), 2012 IEEE International, pp. 392-394. IEEE, 2012.

* cited by examiner

*Primary Examiner* — Usman Khan
(74) *Attorney, Agent, or Firm* — Birch, Stewart, Kolasch & Birch, LLP

(57) ABSTRACT

An active filter includes a transparent area and a non-transparent area; a first cavity arranged in the transparent area and formed between a first pair of electrode plates; a second cavity arranged in the non-transparent area and formed between a second pair of electrode plates, wherein the second cavity connects to the first cavity through a first passage; a first liquid flowing between the first cavity and the second cavity for filtering light within a first wavelength range; and a controller for selectively applying a voltage difference to the first pair of electrode plates or the second pair of electrode plates to make the first liquid flow into one of the first cavity and the second cavity.

14 Claims, 8 Drawing Sheets

RGB mode

RGB+IR mode

IMAGE CAPTURE SYSTEM WITH EMBEDDED ACTIVE FILTERING, AND IMAGE CAPTURING METHOD FOR THE SAME

BACKGROUND OF THE INVENTION

1. Field of the Invention

The present invention relates to an active filter, an image capture system, and an image capturing method, and in particular to an active filter, an image capture system, and an image capturing method, capable of actively switching between a visible light capture mode, an infrared light capture mode, and a visible light plus infrared light capture mode.

2. Description of the Related Art

Infrared light capture can be used in night vision, motion capture, material identification, and temperature difference identification, which differs from visible light capture. Under the requirements for taking a picture, infrared light capture can be utilized with an infrared flashlight in a dark environment to prevent the user from feeling dazzled because of a white light flashlight. In addition, when infrared light is utilized in visible light capture, the infrared light can used for assisting in focus, compensating for the image quality of visible light capture, enhancing image sharpness, or taking a special atmospheric photograph.

A conventional camera requires a filter to block or allow infrared light passing through. Therefore, when different capture modes are switched to meet different conditions, the filter should be changed. However, camera modules are requested for miniaturization (for example, the camera module of a mobile phone), so changing filters is not appropriate.

Therefore, an active filter or an image capture system is needed, which is capable of freely switching between a visible light capture mode, an infrared light capture mode, and a visible light plus infrared light capture mode.

BRIEF SUMMARY OF THE INVENTION

The invention provides an active filter, including: a transparent area and a non-transparent area; a first cavity arranged in the transparent area and formed between a first pair of electrode plates; a second cavity arranged in the non-transparent area and formed between a second pair of electrode plates, wherein the second cavity connects to the first cavity through a first passage; a first liquid capable of flowing between the first cavity and the second cavity for filtering light within a first wavelength range; and a controller for selectively applying a voltage difference to the first pair of electrode plates or the second pair of electrode plates to make the first liquid flow into one of the first cavity and the second cavity.

The active filter further includes: a second liquid capable of flowing into or drained out from the first cavity for filtering light within a second wavelength range, wherein the controller is configured to: apply a voltage difference to the first pair of electrode plates to switch the active filter to a first state by making the second liquid flow into the first cavity; and apply a voltage difference to the second pair of electrode plates to switch the active filter to a second state by making the first liquid flow into the first cavity.

According to an embodiment, in the active filter, the first cavity and the second cavity have the same volume.

According to an embodiment, the active filter further includes a first tank having a first opening and communicating with the first cavity; and a second tank having a second opening connecting to the second cavity, wherein the second tank stores a third liquid under the first state, wherein when the controller switches the active filter from the first state to the second state, the third liquid stored in the second tank flows into the second cavity through the second opening, the first liquid stored in the second cavity is drained out to the first cavity through the first passage, and the second liquid stored in the first cavity is drained out to the first tank through the first opening.

In the active filter, when the controller switches the active filter from the second state to the first state, the second liquid stored in the first tank flows into the first cavity through the first opening, the first liquid stored in the first cavity is drained out to the second cavity through the first passage, and the third liquid stored in the second cavity is drained out to the second tank through the second opening.

According to an embodiment, the active filter further includes: a third cavity arranged in the transparent area and formed between a third pair of electrode plates; and a fourth cavity arranged in the non-transparent area and formed between a fourth pair of electrode plates, wherein the fourth cavity connects to the third cavity through a second passage, wherein the first tank further has a third opening connecting to the third cavity, and the second tank further has a fourth opening connecting to the fourth cavity, wherein under the first state the third cavity stores the second liquid, the fourth cavity stores a fourth liquid, and the first tank stores a fifth liquid, wherein the fourth liquid is capable of filtering light within a third wavelength range, and wherein the controller is configured to: apply a voltage difference to the fourth pair of electrode plates to switch the active filter to a third state by making the third liquid stored in the second tank flow to the fourth cavity through the fourth opening, the fourth liquid stored in the fourth cavity be drained out to the third cavity through the second passage, the second liquid stored in the third cavity be drained out to the first tank through the third opening and the fifth liquid stored in the first tank flows into the first cavity through the first opening.

According to an embodiment, in the active filter, the controller is configured to apply a voltage difference to the third pair of electrode plates to switch the active filter from the third state to the first state by making the second liquid stored in the tank flow into the third cavity through the third opening, the fourth liquid stored in the third cavity be drained out to the fourth cavity through the second passage, and the third liquid stored in the fourth cavity be drained out to the second tank through the fourth opening.

In the active filter, each electrode plate of the first, second, third, and fourth pairs of electrode plates has an inner surface facing the other, wherein the inner surface includes a dielectric layer and a hydrophobic layer.

According to an embodiment, in the active filter, the first cavity and the second cavity have the same volume, and the third cavity and the fourth cavity have the same volume.

According to an embodiment, the first liquid is a first oil which allows infrared light passing through as the filtered light within the first wavelength range, the second and fifth liquid are both water which allows visible light and infrared light passing through as the filtered light within the second wavelength range, and the fourth liquid is a second oil which allows visible light passing through as the filtered light within the third wavelength range.

According to an embodiment, the fourth liquid is capable of filtering light within the third wavelength range from light within the second wavelength range.

According to an embodiment, the first liquid is a first oil which allows visible light passing through as the filtered light within the first wavelength range, the second liquid is water which allows visible light and infrared light passing through as the filtered light within the second wavelength range, the fourth liquid is a second oil which allows visible light passing through as the filtered light within the third wavelength range, and the fifth liquid is a third oil which converts infrared light into one of green light, red light, and blue light.

According to an embodiment, the first liquid converts light within the infrared spectrum into light within the first wavelength range, which is light within the visible spectrum.

The invention further provides an image capture system, including: a camera module and a processor, wherein the camera is operated in a first mode or a second mode and includes: a lens; an active filter configured to switch to a first state to filter light within a first wavelength range when the camera is operated in the first mode, and configured to switch to a second state to filter light within a second wavelength range when the camera is operated in the second mode, wherein the first wavelength range is not equal to the second wavelength range; and an image sensor capable of sensing light within the first wavelength range and the second wavelength range, wherein the processor is connected to the camera module and configured to instruct the camera module to operate in the first mode or the second mode for capturing an image.

According to an embodiment, the image capture system further includes: an infrared flashlight, wherein the processor is further used for: instructing the camera module to do automatic focus to acquire a preview image when the camera module is operated in the first mode; determining whether to instruct the camera module to operate in the second mode according to the preview image; and turning on the infrared flashlight and instructing the camera module to do automatic focus when the camera module is instructed to operate in the second mode.

According to an embodiment, the image capture system further includes: a light sensor for generating a light source parameter, wherein the processor determines whether to instruct the camera module to operate in the second mode to capture images according to the light source parameter.

According to an embodiment, light within the second wavelength range includes infrared light.

According to an embodiment, the active filter is able to be switched to the second state to convert infrared light into visible light as the filtered light within the second wavelength, wherein the image sensor includes a photo chip and a color filtering layer covering the photo chip, wherein the color filtering layer includes red, green, and blue pixels and doesn't include infrared pixels.

According to an embodiment, in the image capture system, the active filter includes a transparent area and a non-transparent area, wherein the lens is arranged at a side of the transparent area of the active filter, and the image sensor is arranged at the other side of the transparent area of the active filter, facing the lens.

According to an embodiment, in the image capture system, the processor is further used for: determining the environmental brightness according to the preview image; instructing the camera module to operate in the second mode and turning on the infrared flashlight to capture images, if the environmental brightness is too low; and instructing the camera module to operate in the first mode to capture images, if the environmental brightness is sufficient.

According to an embodiment, in the image capture system, the processor is further used to execute the operations including: determining if focus is successful or not according to the preview image; instructing the camera module to operate in the second mode and turning on the infrared flashlight to assist in focus, if the focus is not successful; and instructing the camera module to operate in the first mode to capture images, if the focus is successful.

The invention also provides an image capturing method for the above image capture system, including: providing a camera module operated in a first mode or a second mode; and instructing the camera module to operate in the first mode or the second mode to capture images. The camera module includes: a lens; an active filter switched to a first state to filter light within a first wavelength range when the camera is operated in the first mode, and switched to a second state to filter light within a second wavelength range when the camera is operated in the second mode, wherein the first wavelength range is not equal to the second wavelength range; and an image sensor for sensing light within the first wavelength range and the second wavelength range.

According to an embodiment, the image capturing method further includes: providing an infrared flashlight; instructing the camera module to do automatic focus to acquire a preview image when the camera module is operated in the first mode; determining to instruct or not to instruct the camera module to operate in the second mode according to the preview image; and turning on the infrared flashlight and instructing the camera module to do automatic focus when the camera module is instructed to operate in the second mode.

According to an embodiment, the image capturing method further includes: providing a light sensor for generating a light source parameter; and determining to instruct or not to instruct the camera module to operate in the second mode to capture images according to the light source parameter.

According to an embodiment, in the image capturing method, the second wavelength range is larger than and covers the first wavelength range, and light within the second wavelength range includes infrared light.

According to an embodiment, in the image capturing method, the active filter is able to convert infrared light into visible light as the filtered light within the second wavelength.

According to an embodiment, in the image capturing method, the active filter includes a transparent area and a non-transparent area, wherein the lens is arranged at a side of the transparent area of the active filter, and the image sensor is arranged at the other side of the transparent area of the active filter, facing the lens.

According to an embodiment, the image capturing method further includes: determining the environmental brightness according to the preview image; instructing the camera module to operate in the second mode and turning on the infrared flashlight to capture images, if the environmental brightness is too low; and instructing the camera module to operate in the first mode to capture images, if the environmental brightness is sufficient.

According to an embodiment, the image capturing method further includes: determining if focus is successful or not according to the preview image; instructing the camera module to operate in the second mode and turning on the infrared flashlight to assist in focus, if the focus is not successful; and instructing the camera module to operate in the first mode to capture images, if the focus is successful.

According to the active filter, the image capture system, and the image capturing method of the invention, it is possible to freely switch between a visible light capture mode, an infrared light capture mode, and a visible light plus infrared light capture mode to meet different capturing requirements.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims. In the specification and claims, "filter light within a specific wavelength range" means "substantially let light within the specific wavelength to pass and substantially block light not within the specific wavelength."

Because an active filter of the invention uses electrowetting technologies to switch transmissive spectra, the theory of the electrowetting technology is briefly described first.

Figure 1:
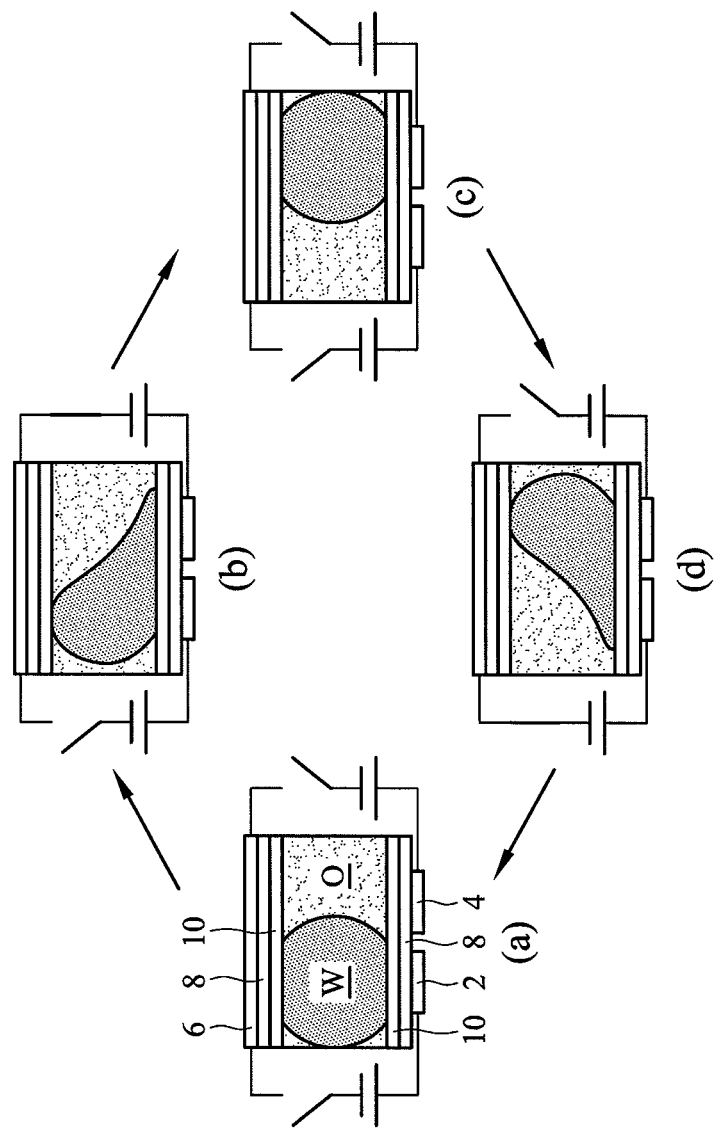
FIGS. 1a~1d are diagrams for explaining operations of an electrowetting system.

FIGS. 1a~1d are diagrams for explaining operations of an electrowetting system. A simple electrowetting system is a structure where polar liquid and nonpolar liquid fill between two hydrophobic layers. As shown in FIG. 1a, the electrowetting system includes electrodes 2, 4, 6, dielectric layers 8, and hydrophobic layers 10. Water W (polar liquid) and oil O (nonpolar liquid) fill between the two dielectric layers 8. Because the water and the oil repel each other, they respectively occupy different sides of the space.

When a voltage difference is applied between the electrodes 4 and 6, the distribution of electric charges on the electrodes 4 will attract water and pull it to the right side (FIG. 1b). After the water is pulled to the right side, the voltage difference is removed and the water returns to a drop-shaped stable state (FIG. 1c). Similarly, when a voltage difference is applied between the electrodes 2 and 6, the distribution of electric charges on the electrodes 2 will attract water and pull it to the left side (FIG. 1c). After the water is pulled to the left side, the voltage difference is removed and the water returns to a drop-shaped stable state (FIG. 1a). In this way, the positions of water and oil can be selectively switched between two sides by applying voltages.

Figure 2:
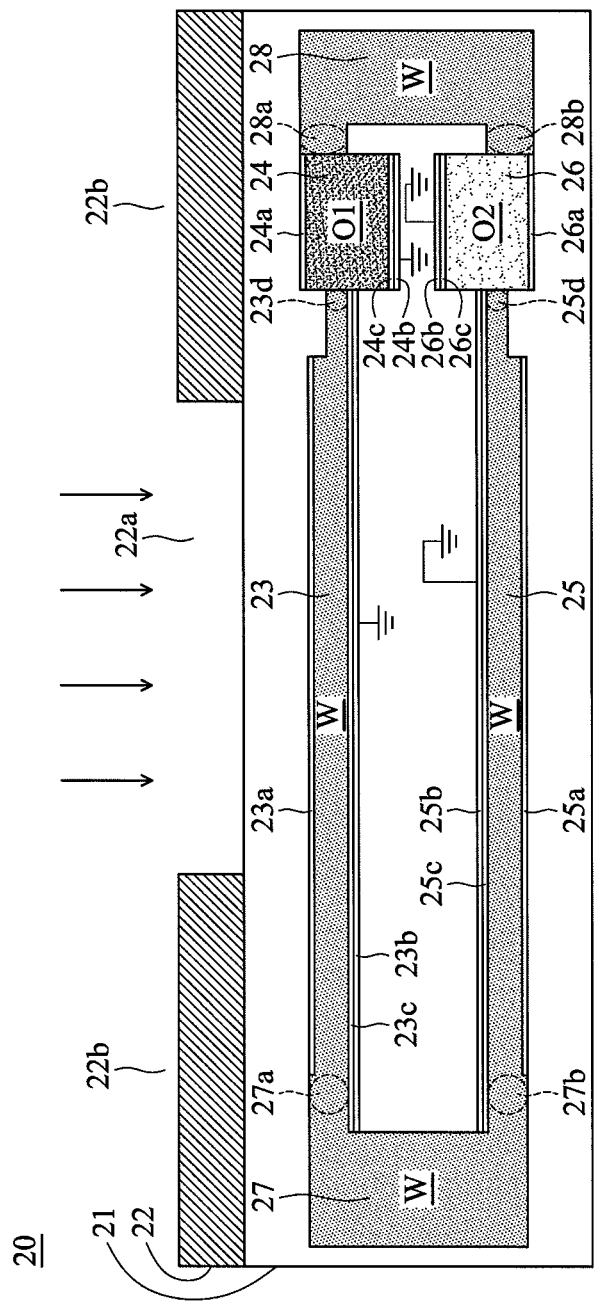
FIG. 2 is a diagram showing a structure of an active filter in accordance with. Embodiment 1 of the invention.

FIG. 2 is a diagram showing a structure of an active filter in accordance with Embodiment 1 of the invention. As shown in FIG. 2, an active filter 20 is formed between a transparent layer 21 and a non-transparent layer 22. The non-transparent layer 22 partially overlaps on the transparent layer 21 to define a transparent area 22a and a non-transparent area 22b. Light (the arrows shown in FIG. 2) passes through the transparent layer 21 from the transparent area 22a.

In the transparent layer 21, there are several cavities and tanks connected to each other to form a circulative structure. Each of the cavities is like the structure shown in FIG. 1 which is formed between two electrodes and hydrophobic layers (including dielectric layers). As shown in FIG. 2, in the transparent layer 21 of the active filter 20, there are 4 cavities 23, 24, 25, 26 (corresponding to the first to fourth cavities described in claims) and 2 tanks 27 and 28 (corresponding to the first to second tanks described in claims). All of the cavities 23~26 are formed between a pair of electrode plates 23a, 23b, 24a, 24b, 25a, 25b, 26a, and 26b. One electrode plate 23a, 24a, 25a, or 26a is for applying voltage and the other electrode plate 23b, 24b, 25b, or 26b is grounded. The inner surface of electrode plates is laid with a hydrophobic and dielectric layer 23c, 24c, 25c, or 26c (for example, Teflon). Though each cavity has the same structure, the cavities 23 and 25 are arranged in the transparent area 22a and the cavities 24 and 26 are arranged in the non-transparent area 22b.

The connection relationship between cavities and tanks is shown in FIG. 2. The cavities 23 and 24 are connected via a passage 23d; the cavities 25 and 26 are connected via a passage 25d; the tank 27 has openings 27a and 27b connected to the cavities 23 and 25 respectively; and the tank 28 has openings 28a and 28b connected to the cavities 23 and 25 respectively.

With this structure, the active filter 20 of Embodiment 1 can determine filter modes of the active filter 20 according to filtering characteristics of the liquid stored in the cavities 23 and 25. In this embodiment, under an initial state where no voltage is applied, the cavities 23 and 25, and the tanks 27 and 28 are filled with water (water in the cavities 23 and 25 correspond to the second liquid described in claims; water in the tank 27 corresponds to the fifth liquid described in claims; and water in the tank 28 corresponds to the third liquid described in claims). Water is polar liquid which can filter light within the wavelength band of visible light and infrared light. The cavity 24 is filled with oil O1 (corresponding to the first liquid described in claims). The oil O1 is nonpolar liquid which can filter light within the wavelength band of infrared light. The cavity 26 is filled with oil O2 (corresponding to the fourth liquid described in claims). The oil O2 is nonpolar liquid which can filter light within the wavelength band of visible light.

In FIG. 2, under the initial state where no voltage is applied, the cavities 23 and 25 are filled with water so visible light and infrared light can pass through the transparent layer 21 from the transparent area 22a.

Figure 3A:
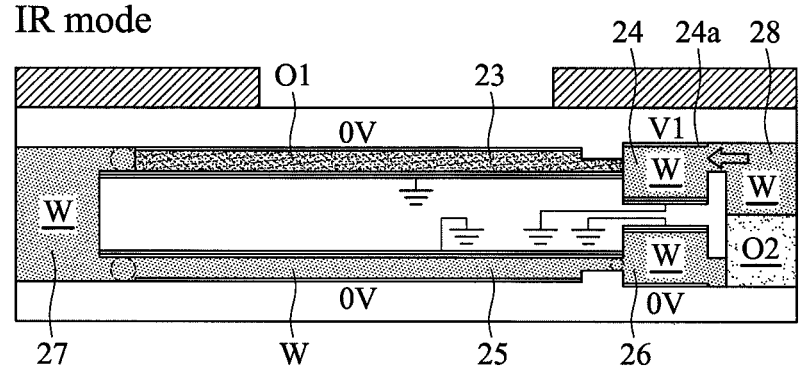
FIGS. 3a~3d are diagrams showing the active filter of Embodiment 1 of the invention switching between different modes.

Next, the operation for the active filter of the embodiment is described. FIGS. 3a~3d are diagrams showing the active filter of the embodiment of the invention switching between different modes. The invention uses the aforementioned theory of the electrowetting technology to move liquid in each cavity. As shown in FIG. 3a, when a voltage V1 is applied to the electrode 24a of the cavity 24, the water stored in the tank 28 is attract to the cavity 24 through the opening 28a and the oil O1 in the cavity 24 is pushed to the cavity 23. Because the cavities and the tanks form a circulative structure, the liquid in each of the cavities and the tanks moves to the next space along the push direction. After the water W fills the cavity 24, which makes all of the oil O1 flow into the cavity 23, the position of each liquid maintains the state shown in FIG. 3a though the applying voltage V1 is removed. Under this state, the cavity 23 is filled with the oil O 1 and the cavity 25 is filled with the water W. Therefore, when light passes through the cavity 23, light except for infrared light will be filtered out. The active filter can be considered changed to an infrared light mode which allows only infrared light passing through.

Figure 3B:
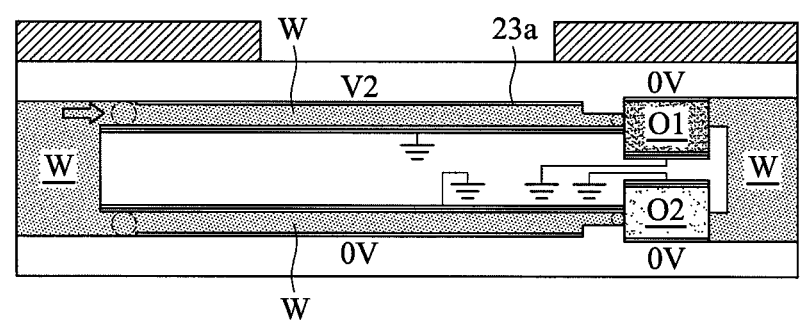

In the infrared light mode, when a voltage V2 is applied to the electrode 23a of the cavity 23, as shown in FIG. 3b, the water stored in the tank 27 is attract to the cavity 23 through the opening 27a and the oil O1 in the cavity 23 is pushed to the cavity 24. The liquid in each of the cavities and the tanks moves to the next space along the push direction, and the voltage V2 is removed after the moving is finished. The position of each liquid returns to the initial state. Under this state, the cavities 23 and 25 are filled with water. Therefore, visible light and infrared light can pass through the cavities 23 and 25. The active filter is switched back to a visible light plus infrared light mode which allows visible light and infrared light passing through.

Figure 3C:
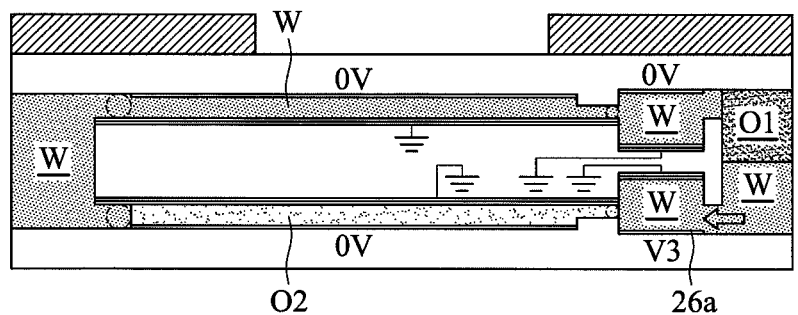

In the visible light plus infrared light mode (initial state), when a voltage V3 is applied to the electrode 26a of the cavity 26, as shown in FIG. 3c, the water stored in the tank 28 is attract to the cavity 26 through the opening 28ba and the oil O2 in the cavity 26 is pushed to the cavity 25. The liquid in each of the cavities and the tanks moves to the next space along the push direction, and the voltage V3 is removed after the moving is finished. Under this state, the cavity 23 is filled with the water W and the cavity 25 is filled with the oil O2. Therefore, only visible light can pass through the cavity 25. The active filter is switched to a visible light mode which allows only visible light passing through.

Figure 3D:
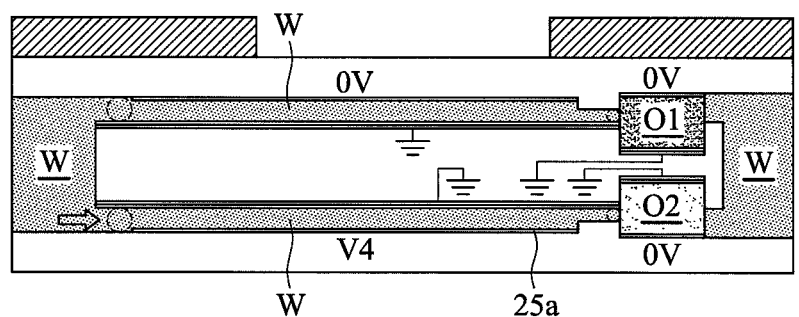

In the visible light mode, when a voltage V4 is applied to the electrode 25a of the cavity 25, as shown in FIG. 3d, the water stored in the tank 27 is attract to the cavity 25 through the opening 27b and the oil O2 in the cavity 25 is pushed to the cavity 26. The liquid in each of the cavities and the tanks moves to the next space along the push direction, and the voltage V4 is removed after the moving is finished. Under this state, the cavities 23 and 25 are filled with water. Therefore, visible light and infrared light can pass through the cavities 23 and 25. The active filter is switched back to the visible light plus infrared light mode which allows visible light and infrared light passing through.

The operation method for the active filter of the invention to switch between different modes has been described. To make the oil O1 stored in the cavity 24 fill the cavity 23 and to make the oil O2 stored in the cavity 26 fill the cavity 25, the cavities 23 and 24 can have the same volume and the cavities 25 and 26 can designed with the same volume. To make the water W stored in the tank 28 rather than the water stored in the cavity 23 flow into the cavity 24 when the voltage V1 is applied to the electrode 24a, the opening 28a can be designed with a larger aperture than that of the passage 23d, or the opening 28a can be designed with lower wall friction than that of the passage 23d, such that the force due to the water W pushes the oil O1 in the cavity 24 to the left side more strongly than to the right side. To make the water W stored in the tank 27 rather than the water stored in the cavity 24 flow into the cavity 23 when the voltage V2 is applied to the electrode 23a, the opening 27a can be designed with a larger aperture than that of the passage 23d, or the opening 27a can be designed with lower wall friction than that of the passage 23d, such that the force due to the water W pushes the oil O1 in the cavity 23 to the right side more strongly than to the left side.

Similarly, to make the water W stored in the tank 28 rather than the water stored in the cavity 25 flow into the cavity 26 when the voltage V3 is applied to the electrode 26a, the opening 28b can be designed with a larger aperture than that of the passage 25d, or the opening 28b can be designed with lower wall friction than that of the passage 25d, such that the force due to the water W pushes the oil O2 in the cavity 26 to the left side more strongly than to the right side. To make the water W stored in the tank 27 rather than the water stored in the cavity 26 flow into the cavity 25 when the voltage V4 is applied to the electrode 25a, the opening 27b can be designed with a larger aperture than that of the passage 25d, or the opening 27b can be designed with lower wall friction than that of the passage 25d, such that the force due to the water W pushes the oil O2 in the cavity 25 to the right side more strongly than to the left side.

According to the active filter of the invention, the visible light mode, the infrared light mode and the visible light plus infrared light mode can be switched freely.

The above embodiment is applicable to the case where an image sensor arranged below the active filter has both visible light sensing pixels and infrared light sensing pixels. When the image sensor has only the visible light sensing pixels, the image sensor cannot sense infrared light under the aforementioned infrared light mode so infrared light images cannot be captured. In view of this, an active filter in accordance with Embodiment 2 of the invention is proposed. With this active filter, infrared light images can be captured under the infrared light mode even the image sensor has only the visible light sensing pixels.

Figure 4A:
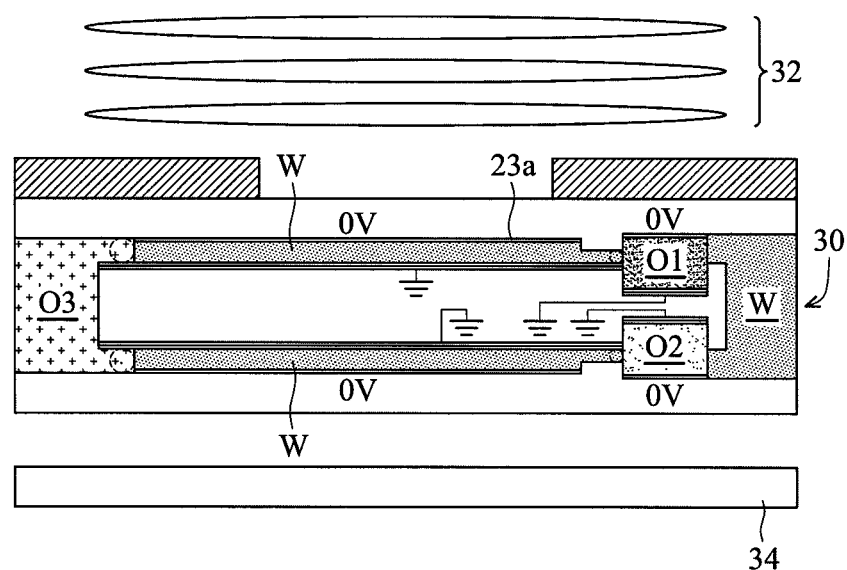
FIGS. 4a and 4b are diagrams showing the active filter of Embodiment 2 of the invention switching between different modes.
Figure 4B:
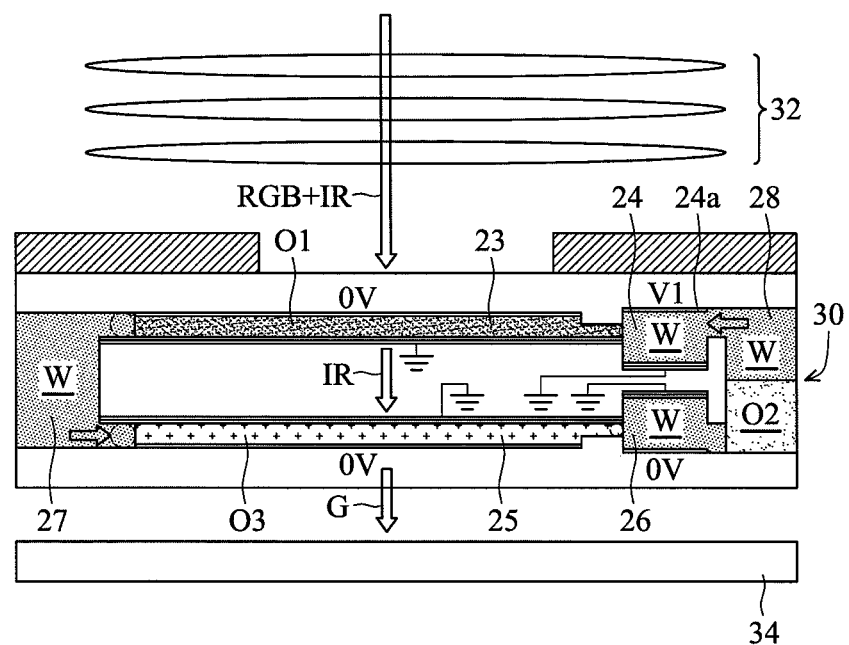

FIGS. 4a and 4b are diagrams showing the active filter of Embodiment 2 of the invention switching between different modes. In FIGS. 4a and 4b, for easy understanding, a camera module 32 arranged above the active filter 30 and an image sensor 34 arranged below the active filter 30 are depicted. The image sensor 34 is not provided with infrared light sensing pixels, and only has visible light sensing pixels. The active filter 30 of Embodiment 2 has the same structure as the active filter 20 of Embodiment 1. The difference is, as shown in FIG. 4a, that under the initial state where no voltage is applied the tank 27 stores oil O3 (corresponding to the fifth liquid described in claims) rather than water W. The oil O3 is blended with phosphor or quantum dots which turns infrared light into green light. Surely, the invention is not limited to green light. Infrared light can be turned into any other colored visible light. Therefore, when the voltage V1 is applied to the electrode 24a of the cavity 24 to switch to the infrared light mode, not only is the oil O1 drained to the cavity 23 but also the oil O3 stored in the cavity 27 is pushed to the cavity 25. The state shown in FIG. 4b is reached.

Under the state shown in FIG. 4b, light including visible light and infrared light IGR+IR passes through the camera module 32 and is incident to the active filter 30. Then only the infrared light IR can pass through the cavity 23. When incident to the cavity 23, the infrared light IR is turned to green light G by the oil O3. Therefore, the image sensor 34 having only the visible sensing pixels can capture infrared light image by sensing green light.

In Embodiment 2, if an unusual case is taken into consideration, wherein when the voltage V3 is applied to the electrode 26a of the cavity 26, the oil O3 stored in the tank 27 will be pushed to the cavity 23. The upper portion and the lower portion of the tank 27 can be filled with the water W and the oil O3 respectively to prevent from the above situation. Otherwise, the tank 27 can be further divided into an upper tank and a lower tank to store the water W and the oil O3 respectively. With this arrangement, even the active filter is switched to the visible light mode, the cavities 23 and 25 are still filled with the water W and the oil O2, which achieve the same effect as shown FIG. 3c.

Figure 5:
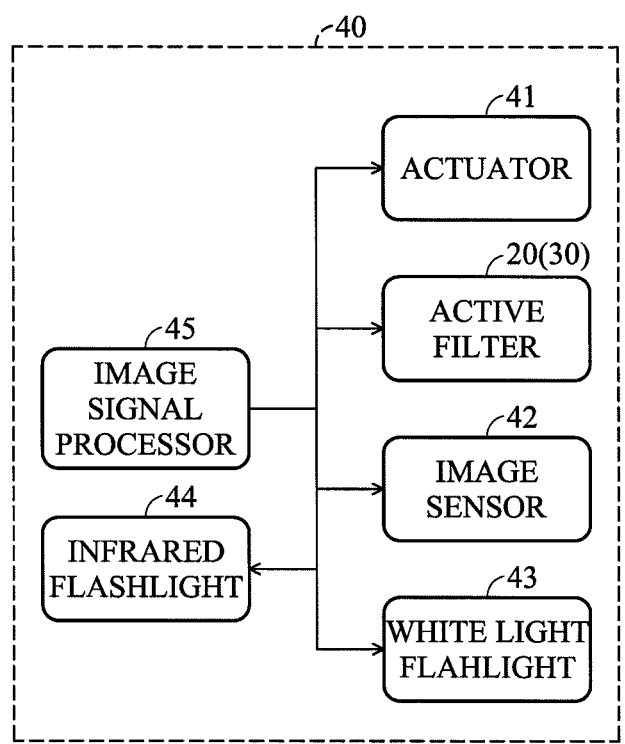
FIG. 5 is a diagram showing an image capture system including the active filter of embodiments of the invention.

FIG. 5 is a diagram showing an image capture system including the active filter of embodiments of the invention. The image capture system includes the aforementioned active filter 20 or 30 for switching different transmissive light capture modes; an actuator 40 driving the camera module arranged at a side of the active filter 20 or 30 to perform a focus operation; an image sensor 42 arranged at the other side of the active filter 20 or 30 to convert optical signals received through the active filter 20 or 30 into electric signals; a white light flashlight 43 for providing assistant light when light source is insufficient; an infrared flashlight 44 for providing assistant light when light source is insufficient; and an image signal processor 45 controlling the movements of the above elements and outputting a captured image after image processing operations.

An advantage of the invention is that processing speed of the image signal processor 45 can be improved when the active filter switches from the visible light mode to the infrared light mode. The reason is that the image signal processor 45 processes fewer amount of pixel signals under the infrared light mode than under the visible light mode. An image signal sensor includes a photo chip and a color filtering layer covering the photo chip. The color filtering layer including red, green, blue, and infrared portions is used here as an example. When a pixel of the image sensor is divided into four sub-pixels R, G, B, and IR, the image signal processor 45 has to process the signals from the sub-pixels R, G, and B under the visible light mode, but the image signal processor 45 has to process only the signals from the sub-pixels IR under the infrared light mode. Otherwise, as described in Embodiment 2, the color filtering layer including only red, green, and blue portions is used as an example. When a pixel of the image sensor is divided into four sub-pixels R, G, G, and B, the image signal processor 45 have to process the signals from the sub-pixels R, G, G, and B under the visible light mode, but the image signal processor 45 has to process only the signals from the sub-pixels G and G under the infrared light mode because the infrared light is converted into green light. Therefore, when operated under the infrared light mode the image signal processor 45 can process image capture with higher frame rates than under the visible light mode. Improvement of the processing speed is beneficial for motion capture under the infrared light mode.

The above image capture system is merely an example. As long as the image capture system of the invention is provided with the active filter 20 or 30, the other elements can use every kind of existing or function-like product.

Figure 6:
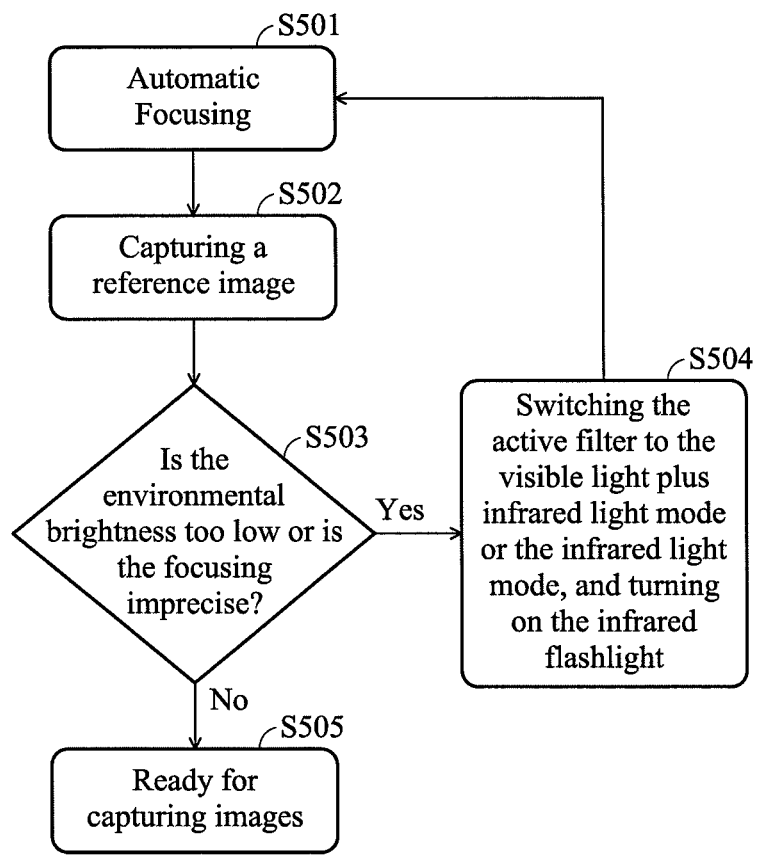
FIG. 6 is a flowchart showing capturing steps of the image capture system in accordance with embodiments of the invention.

FIG. 6 is a flowchart showing capturing steps of the image capture system in accordance with embodiments of the invention. At step S501, the image signal processor 45 controls the actuator 41 to drive the camera module for automatic focus. At step S502, the image signal processor 45 controls the image sensor 42 to capture a reference image. At step S503, whether the environmental brightness is too low or whether the focusing is precise is determined according to the reference image. If the determination result is "No", the procedure proceeds to step S505 and the image capture system is ready for capturing images. Otherwise, if the determination result is "Yes", the procedure proceeds to step S504. At step S504, the image signal processor 45 controls the active filter 20 to switch to the visible light plus infrared light mode or the infrared light mode, and turns on the infrared flashlight to provide assistant light. Then the procedure goes back to step S501 to refocus.

Determining the environmental brightness from the reference image is just an example. The image capturing method of the invention can determine the environmental brightness without capturing a reference image, but through a light sensor which detects the environmental brightness. The light sensor generates a light source parameter for judging the environmental brightness. This light source parameter can be used to determine whether the visible light plus infrared light mode or the infrared light mode should be enabled for the infrared flashlight to provide assistant light.

According to the mage capturing method for the image capture system, In the case where the environment is too dark or focus is difficult, it is possible to switch the active filter to the visible light plus infrared light mode or the infrared light mode and turn on the infrared flashlight to provide assistant light. In addition to providing assistant light, because human cannot sense infrared light, an advantage of the infrared flashlight is preventing the user from feeling dazzling light came from a white light flashlight.

The above flowchart of capturing is merely an example. Depending on requirements, the user can switch the operation modes of the active filter or use a white light flashlight. The invention is not limited to the above example.

According to the active filter, the image capture system, and the image capturing method of the invention, it is possible to freely switch between a visible light capture mode, an infrared light capture mode, and a visible light plus infrared light capture mode to meet different capturing requirements.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An image capture system, comprising:
a camera module and a processor,
wherein the camera is operated in a first mode or a second mode and comprises:
a lens;
an infrared flashlight;
an active filter configured to switch to a first state to filter light within a first wavelength range when the camera is operated in the first mode, and configured to switch to a second state to filter light within a second wavelength range when the camera is operated in the second mode, wherein the first wavelength range is not equal to the second wavelength range; and
an image sensor capable of sensing light within the first wavelength range and the second wavelength range,
wherein the processor is connected to the camera module and configured to instruct the camera module to operate in the first mode or the second mode for capturing an image, and
wherein the processor is further used for:
instructing the camera module to do automatic focus to acquire a preview image when the camera module is operated in the first mode;
determining if focus is successful or not according to the preview image to instruct or not to instruct the camera module to operate in the second mode; and
turning on the infrared flashlight and instructing the camera module to do automatic focus when the camera module is instructed to operate in the second mode.

2. The image capture system as claimed in claim 1, further comprising:
a light sensor for generating a light source parameter,
wherein the processor determines whether to instruct the camera module to operate in the second mode to capture images according to the light source parameter.

3. The image capture system as claimed in claim 1, wherein light within the second wavelength range comprises infrared light.

4. The image capture system as claimed in claim 1, wherein the active filter is able to be switched to the second state to convert infrared light into visible light as the filtered light within the second wavelength,
   wherein the image sensor comprises a photo chip and a color filtering layer covering the photo chip, wherein the color filtering layer comprises red, green, and blue pixels and doesn't comprise infrared pixels.

5. The image capture system as claimed in claim 1, wherein the active filter comprises a transparent area and a non-transparent area,
   wherein the lens is arranged at a side of the transparent area of the active filter, and the image sensor is arranged at the other side of the transparent area of the active filter, facing the lens.

6. The image capture system as claimed in claim 1, wherein the processor is further used for:
   determining the environmental brightness according to the preview image;
   instructing the camera module to operate in the second mode and turning on the infrared flashlight to capture images, if the environmental brightness is too low; and
   instructing the camera module to operate in the first mode to capture images, if the environmental brightness is sufficient.

7. The image capture system as claimed in claim 1, wherein the processor is further used to execute the operations comprising:
   instructing the camera module to operate in the second mode and turning on the infrared flashlight to assist in focus, if the focus is not successful; and
   instructing the camera module to operate in the first mode to capture images, if the focus is successful.

8. An image capturing method, comprising:
   providing a camera module operated in a first mode or a second mode; and
   instructing the camera module to operate in the first mode or the second mode to capture images,
   wherein the camera module comprises:
      a lens;
      an active filter switched to a first state to filter light within a first wavelength range when the camera is operated in the first mode, and switched to a second state to filter light within a second wavelength range when the camera is operated in the second mode, wherein the first wavelength range is not equal to the second wavelength range; and
      an image sensor for sensing light within the first wavelength range and the second wavelength range,
   wherein the image capturing method further comprises:
      providing an infrared flashlight;
      instructing the camera module to do automatic focus to acquire a preview image when the camera module is operated in the first mode;
      determining if focus is successful or not according to the preview image to instruct or not to instruct the camera module to operate in the second mode; and
      turning on the infrared flashlight and instructing the camera module to do automatic focus when the camera module is instructed to operate in the second mode.

9. The image capturing method as claimed in claim 8, further comprising:
   providing a light sensor for generating a light source parameter; and
   determining to instruct or not to instruct the camera module to operate in the second mode to capture images according to the light source parameter.

10. The image capturing method as claimed in claim 8, wherein the second wavelength range is larger than and covers the first wavelength range, and light within the second wavelength range comprises infrared light.

11. The image capturing method as claimed in claim 8, wherein the active filter is able to convert infrared light into visible light as the filtered light within the second wavelength.

12. The image capturing method as claimed in claim 8, wherein the active filter comprises a transparent area and a non-transparent area,
   wherein the lens is arranged at a side of the transparent area of the active filter, and the image sensor is arranged at the other side of the transparent area of the active filter, facing the lens.

13. The image capturing method as claimed in claim 8, further comprising:
   determining the environmental brightness according to the preview image;
   instructing the camera module to operate in the second mode and turning on the infrared flashlight to capture images, if the environmental brightness is too low; and
   instructing the camera module to operate in the first mode to capture images, if the environmental brightness is sufficient.

14. The image capturing method as claimed in claim 8, further comprising:
   instructing the camera module to operate in the second mode and turning on the infrared flashlight to assist in focus, if the focus is not successful; and
   instructing the camera module to operate in the first mode to capture images, if the focus is successful.

* * * * *